United States Patent
de la Fuente (10) Patent No.: US 10,444,794 B1
(45) Date of Patent: Oct. 15, 2019

(54) KEYBOARD DOCK THAT KEEPS PIN FLUSH UNTIL MATING WITH COMPUTING DEVICE

(71) Applicant: GOOGLE LLC, Mountain View, CA (US)

(72) Inventor: Valentin de la Fuente, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/104,380

(22) Filed: Aug. 17, 2018

(51) Int. Cl.
  *G06F 1/16* (2006.01)
  *G06F 3/02* (2006.01)
  *H04B 1/38* (2015.01)

(52) U.S. Cl.
  CPC .......... *G06F 1/1632* (2013.01); *G06F 1/1656* (2013.01); *G06F 3/0202* (2013.01); *H04B 1/38* (2013.01)

(58) Field of Classification Search
  CPC .... G06F 1/1632; G06F 3/0202; G06F 1/1656; H04B 1/38
  USPC ................. 361/79.01–679.3, 679.41–679.44, 361/679.55–679.6
  See application file for complete search history.

(56) References Cited

U.S. PATENT DOCUMENTS

| | | | | |
|---|---|---|---|---|
| 7,599,178 B2 * | 10/2009 | Huang | ................. | G06F 1/1632 361/679.28 |
| 9,941,627 B2 | 4/2018 | Esmaeili et al. | | |
| 2008/0055844 A1 * | 3/2008 | Kobayashi | ............ | G06F 1/1632 361/679.43 |
| 2010/0265652 A1 * | 10/2010 | Agata | ................... | G06F 1/1632 361/679.41 |
| 2013/0107445 A1 * | 5/2013 | Reber | ................... | G06F 1/1632 361/679.41 |
| 2013/0155583 A1 * | 6/2013 | Yang | ..................... | G06F 1/1626 361/679.01 |
| 2013/0273752 A1 * | 10/2013 | Rudisill | ............. | H01R 13/6205 439/39 |
| 2013/0335914 A1 | 12/2013 | Lee | | |
| 2014/0133080 A1 * | 5/2014 | Hwang | ................. | G06F 1/1632 361/679.17 |

(Continued)

FOREIGN PATENT DOCUMENTS

| | | |
|---|---|---|
| WO | 2013039515 A1 | 3/2013 |
| WO | 2014120966 A1 | 8/2014 |

OTHER PUBLICATIONS

NewEgg, "Original Chuwi HiBook Pro/HiBook/Hi10 Pro Pogo Pin Magnetic Docking Multimodal Rotary Shaft Separable Keyboard", https://www.newegg.com/Product/Product.aspx?Item=0GA-00GV-00009, printed May 9, 2018, 3 pages.

(Continued)

*Primary Examiner* — Steven T Sawyer
*Assistant Examiner* — Sagar Shrestha
(74) *Attorney, Agent, or Firm* — Brake Hughes Bellermann LLP (57) ABSTRACT

A dock can comprise a keyboard; and a frame supporting the keyboard. The frame can include a cover, at least one spring, a support, and a protrusion. The cover can define at least one hole. The at least one spring can secure the cover to the support. The support can be attached to the frame and to the spring. The support can include a ferromagnetic material. The at least one protrusion can extend from the support into the at least one hole.

16 Claims, 6 Drawing Sheets

(56) References Cited

U.S. PATENT DOCUMENTS

| | | | |
|---|---|---|---|
| 2015/0192957 A1* | 7/2015 | Lee .................... | G06F 1/1632 |
| | | | 361/679.58 |
| 2017/0093087 A1* | 3/2017 | Esmaeili .............. | H01R 12/61 |
| 2017/0220076 A1* | 8/2017 | Gerbus ................ | G06F 1/1681 |
| 2018/0184533 A1 | 6/2018 | Katsuyama et al. | |

OTHER PUBLICATIONS

International Search Report and Written Opinion for Application No. PCT/US2019/032241, dated Aug. 16, 2019 10 pages.

* cited by examiner

KEYBOARD DOCK THAT KEEPS PIN FLUSH UNTIL MATING WITH COMPUTING DEVICE

TECHNICAL FIELD

This description relates to keyboard docks, such as keyboard docks for tablet computing devices.

BACKGROUND

Keyboard docks can mate with computing devices, such as tablet computing devices, to provide a keyboard interface for the computing device. Contact pins extending from the keyboard docks can be unsightly and prone to damage.

SUMMARY

A dock can include a keyboard and a cover that is biased away from a support of the dock, such as by a spring. Electrically conductive pins can extend into holes defined by the cover, and be flush with the cover when the dock is not mated with a computing device. When the dock mates with a computing device, the cover can retract, causing the pins to extend beyond the cover, enabling the pins to engage contacts of the computing device.

According to an example, a dock can comprise a keyboard and a frame supporting the keyboard. The frame can include a cover, at least one spring, a support, and a protrusion. The cover can define at least one hole. The at least one spring can secure the cover to the support. The support can be attached to the frame and to the spring. The support can include a ferromagnetic material. The at least one protrusion can extend from the support into the at least one hole.

According to an example, a dock can comprise a keyboard, a frame supporting the keyboard, and a mount rotatably attached to the frame. The mount can include a support, a cover, and at least one electrically conductive pin. The support can include a ferromagnetic material. The cover can be biased away from the support, and can define at least one hole. The electrically conductive pin can be electrically coupled to the keyboard and can extend from the support into the at least one hole.

According to an example, a dock can comprise a keyboard, a frame supporting the keyboard, and a mount rotatably attached to the frame. The mount can include a support, a cover biased away from the support, and at least one electrically conductive pin. The support can include a ferromagnetic material. The cover can define at least one hole. The cover can be attached to the support so that the cover is biased away from the support. The electrically conductive pin can be in communication with the keyboard and can extend from the support into the at least one hole.

The details of one or more implementations are set forth in the accompanying drawings and the description below. Other features will be apparent from the description and drawings, and from the claims.

DETAILED DESCRIPTION

Figure 1A:
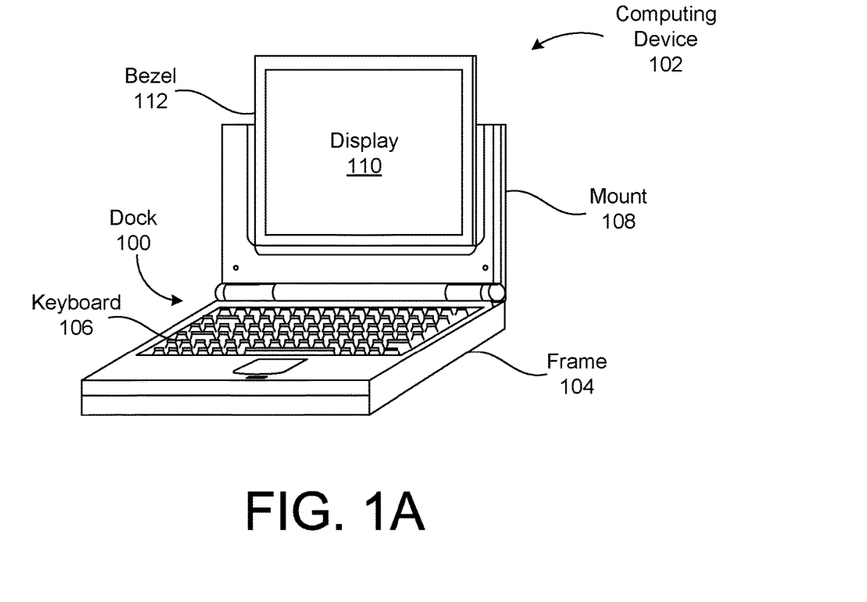
FIG. 1A is a perspective view of a computing device mated with a keyboard dock according to an example embodiment.

FIG. 1A is a perspective view of a computing device 102 mated with a keyboard dock 100 according to an example embodiment. The computing device 102 can include a tablet computing device without a keyboard. The computing device 102 can include a display 110 surrounded by a bezel 112. The display 110 can include a touchscreen, enabling a user to provide input to the computing device 102 by touching the display 110 with her or her fingers.

The dock 100 can hold the computing device 102, and can include a keyboard 106, causing the combination of the dock 100 and computing device 102 to function as a laptop or notebook computer. The dock 100 can include a frame 104 that supports the keyboard 106. The dock 100 can also include a mount 108 that holds and/or supports the computing device 102 in an upright position, mated with the dock 100, in which the display 110 is easily viewed by the user. In some embodiments, the mount 108 can be considered part of the frame 104.

The dock 100 can transmit signals from the keyboard 106, such as signals that represent keystrokes inputted by the user, to the computing device 102. The dock 100 can transmit the signals to the computing device 102 via electrical contacts and/or pins included in both the dock 100 and the computing device 102, or via a wireless transceiver. In some examples in which the dock 100 transmits the signals via electrical contacts, the dock 100 can include electrically conductive pins via which the dock 100 transmits the signals, and the computing device 102 can include electrically conductive contacts via which the computing device 102 receives the signals.

Figure 1B:
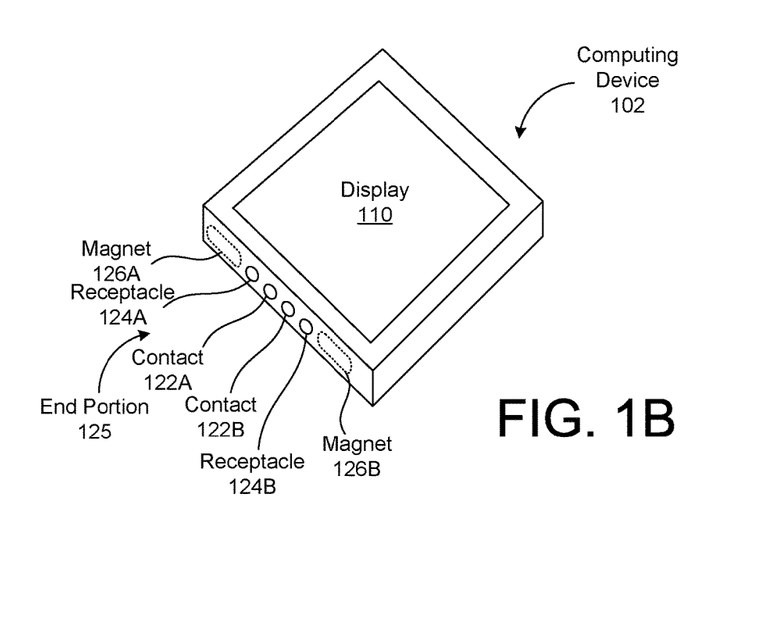
FIG. 1B is a perspective view of the computing device according to an example embodiment.

FIG. 1B is a perspective view of the computing device 102 according to an example embodiment. In this example, the computing device 102 can include at least one, such as two, electrical contacts 122A, 122B on an end portion 125 of the computing device 102. The computing device 102 can receive the electrical signals from the dock 100 via the electrical contacts 122A, 122B.

The computing device 102 can include at least one, such as two, receptacles 124A, 124B on the end portion 125 of the computing device 102. The receptacles 124A, 124B can receive protrusions or tabs from the dock 100, securing the computing device 102 in position with respect to the dock 100. In some examples, the receptacles 124A, 124B can include holes defined by the computing device 102. In some examples, the receptacles 124A, 124B can include disks or other objects biased, such as by springs, to be flush with the end portion 125 of the computing device 102, and which respond to pressure by contracting into the computing device 102 to receive protrusions or tabs from the dock 100.

The computing device 102 can include at least one, such as two, magnets 126A, 126B at the end portion 125 of the computing device 102. The magnets 126A, 126B can be attracted to magnets and/or ferromagnetic material in the dock 100. The attraction can secure the computing device 102 to the dock 100, and/or cause a cover of the dock 100 to retract, causing one or more pins, protrusions, and/or tabs to extend beyond the cover of the dock and extend into and/or contact the contact(s) 122A, 122B and/or receptacle 124A, 124B when the dock 100 mates with the computing device 102.

Figure 1C:
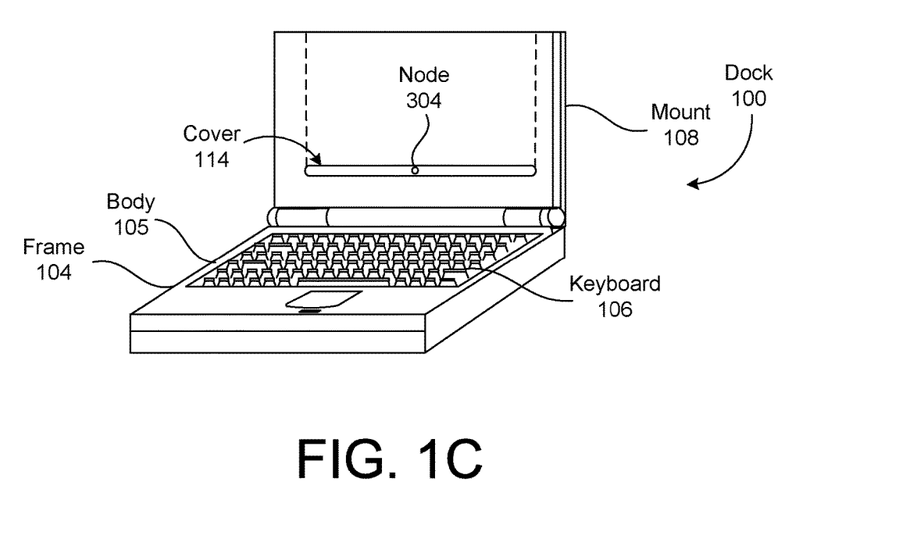
FIG. 1C is a perspective view of the keyboard dock according to an example embodiment.

FIG. 1C is a perspective view of the keyboard dock 100 according to an example embodiment. The dock 100 can include the frame 104 supporting the keyboard 106. The frame 104 can include a body 105 that supports the keyboard 106. The dock 100 can include the mount 108 rotatably attached to the frame 104. The mount 108 can hold the computing device 102 (not shown in FIG. 1C) in a position to be easily viewed by the user.

The mount 108 can include a cover 114. The computing device 102 can rest on the cover 114 when the computing device 102 is mated with the dock 100. The cover 114 can cover and/or surround protrusions, pins, and/or tabs included in the dock 100. The cover 114 can be biased to an outward position, such as by one or more springs, rigid members, air pressure, or by magnets. In the outward and/or biased position, the cover 114 can cover and/or surround the protrusions, pins, and/or tabs so that the protrusions, pins, and/or tabs are flush with the cover 114.

The mount 108 can include at least one node 304 that transmits signals from the keyboard 106, such as signals representing keystroke inputs from the user, to the computing device 102. The node 304 can include electrically conductive pins 304A, 304B shown in FIG. 3, or can include a wireless transceiver that transmits wireless and/or electromagnetic signals from the keyboard 106 to the computing device 102. The node 304 can be electrically coupled to the keyboard 106.

Figure 2:
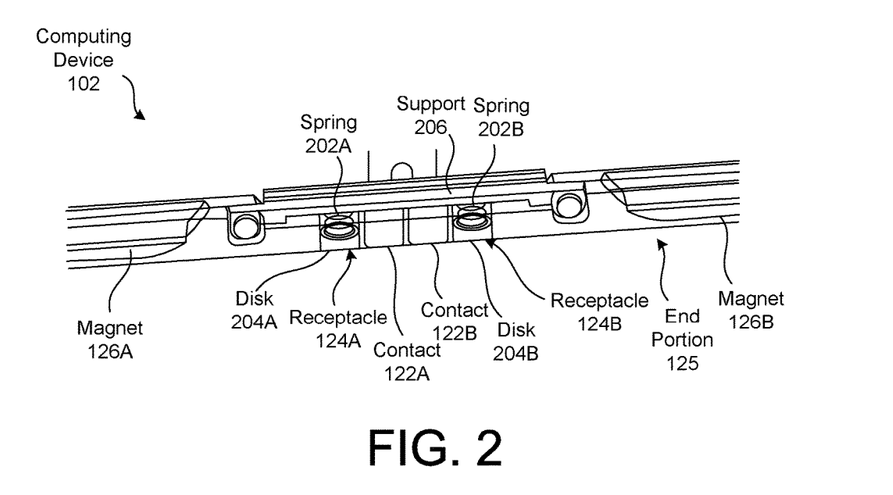
FIG. 2 is an open view of an end portion of the computing device according to an example embodiment.

FIG. 2 is an open view of the end portion 125 of the computing device 102 according to an example embodiment. In this example, the computing device 102 includes two contacts 122A, 122B in the end portion 125. The contacts 122A, 122B can be electrically conductive, can be coupled to a processor of the computing device 102, and/or can transmit signals received from the dock 100 (not shown in FIG. 2) to the processor of the computing device 102.

In the example shown in FIG. 2, the computing device 102 defines two receptacles 124A, 124B. In some examples, the contacts 122A, 122B are disposed between the receptacles 124A, 124B. In some examples, the receptacles 124A, 124B include disks 204A, 204B or other objects biased outward so that, in a resting position, the disks 204A, 204B are flush with an outer portion of the end portion 125. The disks 204A, 204B or other objects can respond to pressure by retracting into the receptacles 124A, 124B, enabling the receptacles to receive protrusions or tabs from the dock 100, securing the computing device 102 in position with respect to the dock 100 when the dock 100 is mated with the computing device 102. In some examples, the computing device 102 includes springs 202A, 202B mechanically coupled to the disks 204A, 204B or other objects and to a support 206 included in the computing device 102. The mechanical coupling of the springs 202A, 202B to the disks 204A, 204B or other objects and to the support 206 can bias the disks 204A, 204B or other objects outward to be flush with the end portion 125 of the computing device 102.

The computing device 102 can include at least one magnet 126A, 126B. In examples in which the computing device 102 includes at least two magnets 126A, 126B, the contacts 122A, 122B and/or receptacles 124A, 124B can be disposed between the magnets 126A, 126B. The magnet(s) 126A, 126B can attract the dock 100 toward the end portion 125 of the computing device 102, securing the computing device 102 in position with respect to the dock 100 and causing the cover 114 (not shown in FIG. 2) of the dock 100 to retract and the dock 100 to mate with the computing device 102.

Figure 3:
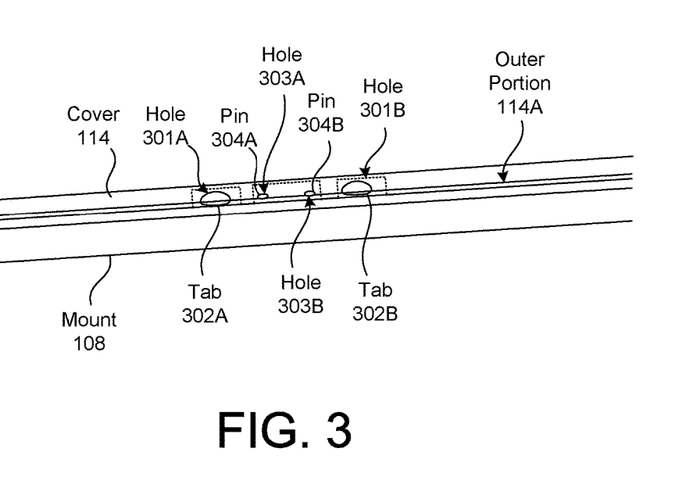
FIG. 3 is a perspective view of a portion of a mount of the keyboard dock according to an example embodiment.

FIG. 3 is a perspective view of a portion of the mount 108 of the keyboard dock 100 according to an example embodiment. In some examples, the cover 114 is biased outward away from a support 504 included in the mount 108. The cover 114 can define at least one, two or more, and/or multiple, hole(s) 301A, 301B, 303A, 303B.

The mount 108 can include at least one, and/or multiple, electrically conductive pins 304A, 304B and/or protrusions. The electrically conductive pins 304A, 304B are examples of the node 304 shown in FIG. 1C, and can transmit signals from the keyboard 106 (not shown in FIG. 3), representing keystrokes by the user, to the contacts 122A, 122B of the computing device 102. The pins 304A, 304B and/or protrusions can extend into the hole(s) 303A, 303B defined by the cover 114 when the cover 114 is in the resting and/or biased position, and the pins 304A, 304B and/or protrusions can extend through the hole(s) 303A, 303B and beyond an outer portion 114A of the cover 114 when the cover 114 is in a retracted position.

The mount 108 can include at least one, and/or multiple, tabs 302A, 302B. The tabs 302A, 302B can be received by, and/or extend into, the receptacles 124A, 124B, to secure the computing device 102 in position with respect to the dock 100. The tabs 302A, 302B can extend into the hole(s) 301A, 301B defined by the cover 114 when the cover 114 is in the resting and/or biased position, and the tabs 302A, 302B can extend through the hole(s) 301A, 301B and beyond the outer portion 114A of the cover 114 when the cover 114 is in a retracted position and the mount 108 is mated with the computing device 102. The tabs 302A, 302B can also be considered protrusions, and can include and/or be made of insulator materials that do not conduct electricity and/or electrical signals.

In the biased or resting position, when the cover 114 is extended away from the support 504, electrically conductive pins 304A, 304B and/or protrusions can be flush with an outer portion 114A of the cover 114. In the biased and/or resting position, the tabs 302A, 302B can be flush with the outer portion 114A of the cover 114. The outer portion 114A of the cover 114 can be opposite from an inner portion 114B of the cover 114 to which the spring(s) 502A, 502B are attached. When the cover 114 retracts toward the support 504 in response to pressure, the electrically conductive pins 304A, 304B and/or protrusions, and/or tabs 302A, 302B, can extend beyond the cover 114 to engage the contacts 122A, 122B of the computing device 102, mating the dock 100 with the computing device 102.

Figure 4:
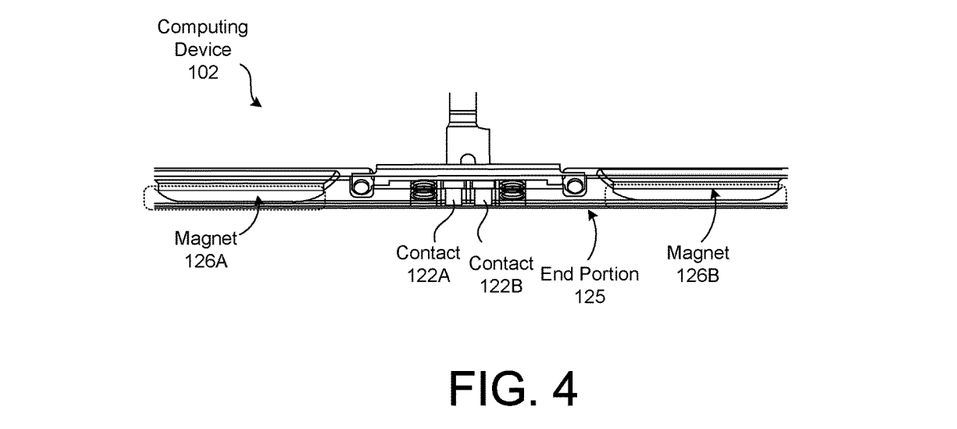
FIG. 4 is another open view of the end portion of the computing device according to an example embodiment.

FIG. 4 is another open view of the end portion 125 of the computing device 102 according to an example embodiment. As shown in this example, the contacts 122A, 122B are disposed between the magnets 126A, 126B.

Figure 5:
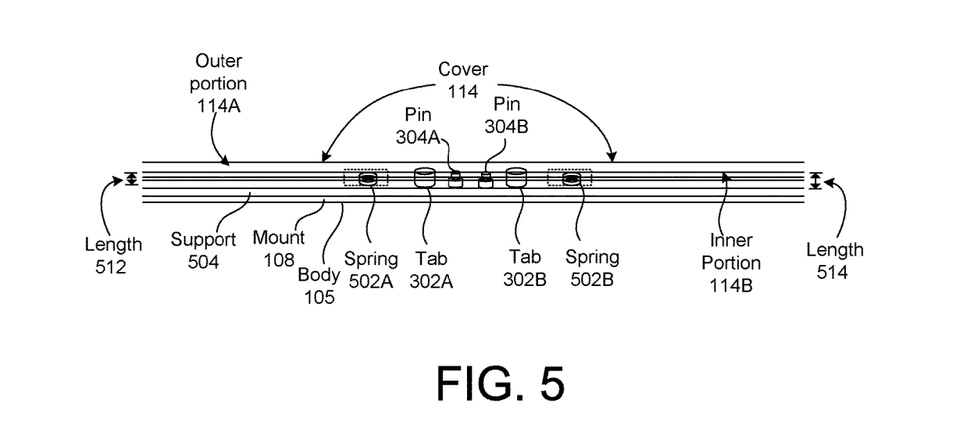
FIG. 5 is an open view of a portion of the mount according to an example embodiment.

FIG. 5 is an open view of a portion of the mount 108 according to an example embodiment. In this example, the cover 114 can be biased away from a support 504 of the mount 108, and/or a body 105 of the dock 100, by at least one spring, such as two springs 502A, 502B. The support 504 and/or body 105 can be attached to the frame 104.

The springs 502A, 502B can be mechanically coupled to both the support 504 and the cover 114. The springs 502A, 502B can bias the cover 114 away from the support 504. The springs 502A, 502B can retract in response to pressure applied to the cover 114, causing the cover 114 to retract toward the support 504. The retraction of the cover 114 can enable the pin(s) 304A, 304B and/or protrusion(s) to extend beyond the cover 114, allowing the pin(s) 304A, 304B and/or protrusion(s) to contact and/or engage the contact(s) 122A, 122B of the computing device 102, electrically coupling the keyboard 106 to the computing device 102 when the dock 100 is mated with the computing device 102.

The pins 304A, 304B and/or protrusions, and/or the tabs 302A, 302B, can extend from the support 504 and/or the body 105 into the holes 301A, 301B, 303A, 303B (not labeled in FIG. 5). A length 514 of the pin(s) 304A, 304B and/or protrusion(s) can be greater than a length 512 of the spring(s) 502A, 502B. The retraction of the cover 114 can enable tab(s) 302A, 302B to extend beyond the cover 114, allowing the tab(s) 302A, 302B to enter and/or engage the receptacle 124A, 124B of the computing device 102, securing the computing device 102 in position with respect to the mount 108.

In some examples in which the mount 108 includes two or more springs 502A, 502B, the pin(s) 304A, 304B and/or protrusion(s) can be disposed between the springs 502A, 502B. In some examples in which the mount 108 includes two or more springs 502A, 502B, the tab(s) 302A, 302B can be disposed between the springs 502A, 502B. In some examples in which the mount 108 includes two or more tabs 302A, 302B, the pin(s) 304A, 304B and/or protrusion(s) can be disposed between the tabs 302A, 302B.

The support 504 can include one or more magnets, be magnetic, and/or be made of and/or include a ferromagnetic material, such as iron, nickel, cobalt, or an alloy including iron, nickel, or cobalt, that is attracted to the magnet(s) 126A, 126B of the computing device 102. The attraction of the support 504 to the magnet(s) 126A, 126B can cause the cover 114 to retract when the end portion 125 of the computing device 102 is placed onto the cover 114, and can secure the computing device 102 in position with respect to the mount 108 when the dock 100 is mated to the computing device 102.

Figure 6:
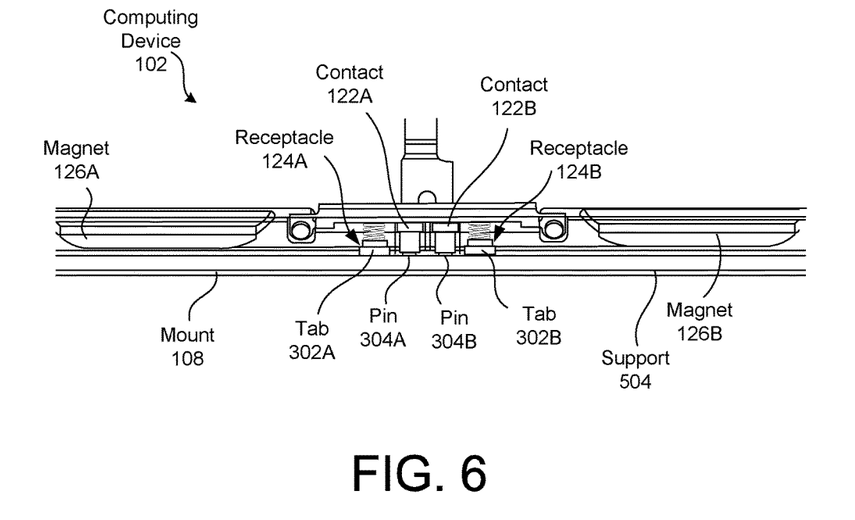
FIG. 6 is an open view showing a portion of the computing device mated with a portion of the keyboard dock according to an example embodiment.

FIG. 6 is an open view showing a portion of the computing device 102 mated with a portion of the keyboard dock 100 according to an example embodiment. In this example, the support 504 is attracted to the magnet(s) 126A, 126B, causing the computing device 102 to apply pressure to the cover 114, causing the cover 114 to retract toward the support 504. The retraction of the cover 114 toward the support 504 enables the pin(s) 304A, 304B and/or protrusion(s) to extend beyond the cover 114, engaging and/or contacting the contact(s) 122A, 112B, electrically coupling the keyboard 106 (not shown in FIG. 6) to the computing device 102. The retraction of the cover 114 toward the support 504 enables the tab(s) 302A, 302B to extend beyond the cover 114, engaging and/or entering the receptacle 124A, 124B, securing the computing device 102 in position with respect to the mount 108.

Figure 7:
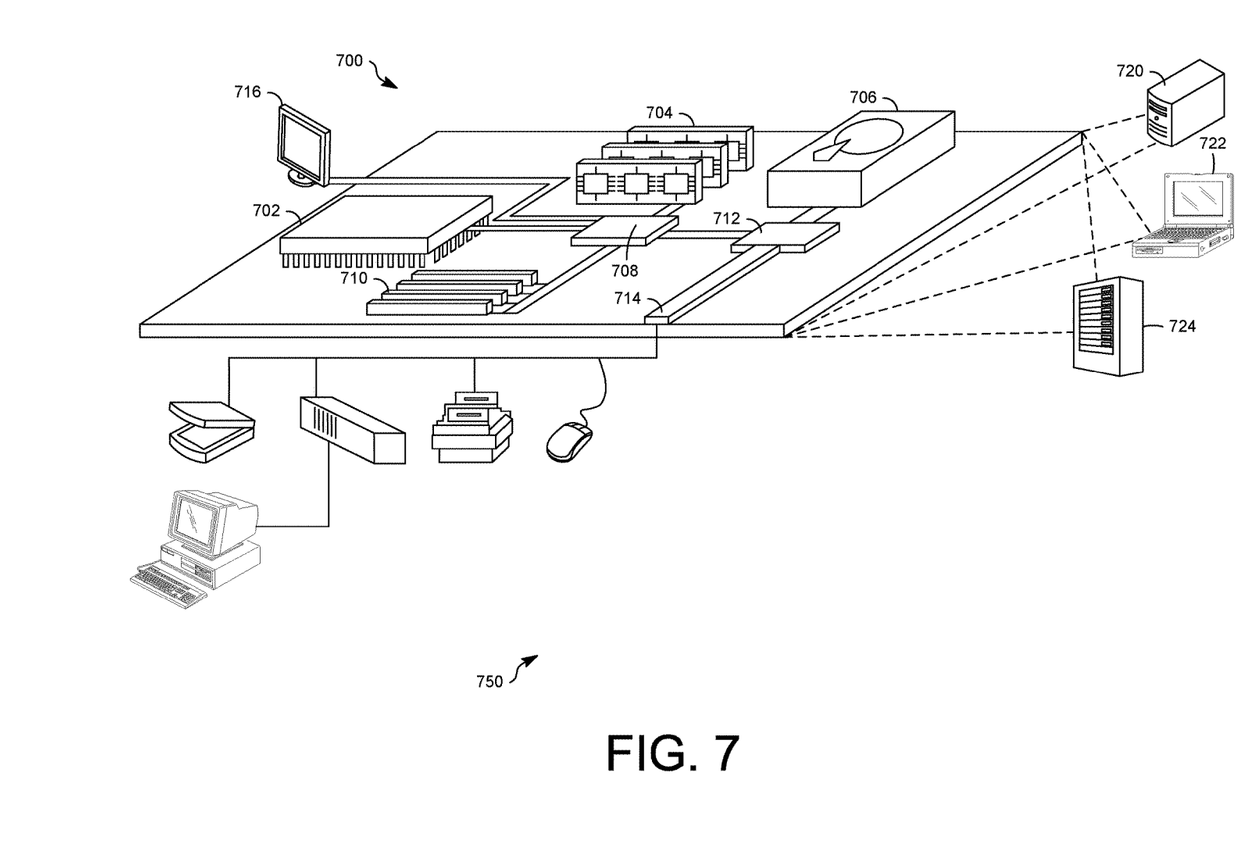
FIG. 7 shows an example of a computer device that can be used to implement the techniques described here.

FIG. 7 shows an example of a generic computer device 700 which may be used with the techniques described here. Computing device 700 is an example of the dock 100 or the computing device 102 described above, and is intended to represent various forms of digital computers, such as laptops, desktops, tablets, workstations, personal digital assistants, televisions, servers, blade servers, mainframes, and other appropriate computing devices.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. The processor 702 can be a semiconductor-based processor. The memory 704 can be a semiconductor-based memory. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," or, "computer-readable storage medium," refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A dock comprising:
a keyboard; and
a frame supporting the keyboard, the frame comprising:
    a cover, the cover defining a first hole and a second hole, the cover including an inner portion and an outer portion opposite from the inner portion;
    at least one spring, the at least one spring being mechanically coupled to both the inner portion of the cover and to a support, the at least one spring biasing the cover away from the support into a biased position;
    the support attached to the frame and to the at least one spring, the support including a ferromagnetic material;
    a first protrusion extending from the support into the first hole, the first protrusion being flush with the outer portion of the cover when the cover is in the biased position; and
    a second protrusion extending from the support into the second hole, the second protrusion comprising an insulator material and extending from the support into the second hole.

2. The dock of claim 1, wherein:
the at least one spring comprises a first spring and a second spring; and
the first protrusion is disposed between the first spring and the second spring.

3. The dock of claim 1, wherein the support is magnetized.

4. The dock of claim 1, wherein the dock is configured to transmit signals from the keyboard to a computing device via the first protrusion.

5. The dock of claim 1, wherein a length of the first protrusion is greater than a length of the at least one spring.

6. The dock of claim 1, wherein the first protrusion is configured to extend beyond the cover when the at least one spring is compressed.

7. The dock of claim 1, further comprising a wireless transceiver configured to transmit signals from the keyboard to a computing device.

8. A dock comprising:
a keyboard;
a frame supporting the keyboard; and
a mount rotatably attached to the frame, the mount comprising:
    a support, the support including a ferromagnetic material;
    a cover biased away from the support in a biased position, the cover defining a first hole and a second hole; and
    a first electrically conductive pin and a second electrically conductive pin, the first and second electrically conductive pins being electrically coupled to the keyboard, the first electrically conductive pin extending from the support into the first hole, the second electrically conductive pin extending from the support into the second hole, the first and second electrically conductive pins being flush with an outer portion of the cover when the cover is in the biased position, the outer portion of the cover being farthest from the support.

9. The dock of claim 8, wherein, when the cover is contracted toward the support, the first electrically conductive pin extends beyond the outer portion of the cover.

10. The dock of claim 8, wherein the support is magnetized.

11. A dock comprising:
a keyboard;
a frame supporting the keyboard; and
a mount rotatably attached to the frame, the mount comprising:
  a support, the support including a ferromagnetic material;
  a cover biased away from the support, the cover defining a first hole and a second hole, the cover being attached to the support so that the cover is biased away from the support in a biased position; and
  a first electrically conductive pin extending from the support into the first hole and a second electrically conductive pin extending from the support into the second hole, the first and second electrically conductive pins being in communication with the keyboard, the first and second electrically conductive pins being flush with an outer portion of the cover when the cover is in the biased position, the outer portion of the cover being farthest from the support that the cover is biased away from.

12. The dock of claim 11, wherein, when the cover is pressed toward the support, the first electrically conductive pin extends beyond the outer portion of the cover.

13. The dock of claim 11, wherein the support is magnetized.

14. The dock of claim 1, wherein, when pressure applied to the cover causes the at least one spring and the cover to retract toward the support, the first protrusion extends beyond the outer portion of the cover.

15. The dock of claim 8, wherein, when pressure applied to the cover causes the cover to retract toward the support, the first electrically conductive pin extends beyond the outer portion of the cover.

16. The dock of claim 11, wherein, when pressure applied to the cover causes the cover to retract toward the support, the first electrically conductive pin extends beyond the outer portion of the cover.

* * * * *